Patented June 10, 1930

1,762,729

UNITED STATES PATENT OFFICE

JOHN McGAVACK, OF JACKSON HEIGHTS, NEW YORK, ASSIGNOR TO THE NAUGATUCK CHEMICAL COMPANY, OF NAUGATUCK, CONNECTICUT, A CORPORATION OF CONNECTICUT

METHOD OF TREATING LATEX AND PRODUCT OBTAINED THEREBY

No Drawing. Application filed October 14, 1927. Serial No. 226,256.

The formation of gels containing rubber has heretofore been accomplished by the use of rubber solutions in organic solvents, it being proposed to vulcanize the rubber while in solution, thus forming an irreversible gel having an elastic structure which is not readily susceptible to change. Another illustration of a rubber gel is that produced by coagulation methods. This gel is likewise irreversible, that is, cannot again be directly converted into the latex.

The present invention is concerned with a reversible type of rubber gel, in which the structure characteristic of gels is found, while at the same time the rubber particles in the gel do not show any coagulation.

Accordingly, one of the objects of the invention is to prepare a reversible gel of uncoagulated rubber. Another object is to prepare a gel of uncoagulated rubber which has the property of being dispersible in water or other non-solvent. A further object is to form such a gel by the use of a very small amount of the desired gelling agent. A still further object is to furnish a new method for thickening rubber latices without causing their coagulation. Another object is to provide a method for making a rubber gel which is capable of holding in suspension, large quantities of compounding ingredients, and at the same time having great mechanical stability. A still further object is to provide a method for imparting a uniform working consistency to latices of varying concentration and containing varying amounts of compounding ingredient.

Briefly stated, the invention consists in treating a latex of any sort or concentration with a small amount of a hydrosol of silicic acid. It is within the scope of the invention to add a preformed hydrosol of silicic acid to the latex or to form the hydrosol in the latex. It is also within the scope of the invention to employ either the alkaline or the acid hydrosol.

While the invention is not limited to any particular method of preforming the hydrosol of silicic acid, it is desirable that the material be prepared in such a manner as to give a gel formation within a definite period of time, which may be anywhere between 30 seconds and 48 hours.

It is preferable, when using ordinary ammonia preserved latex, to make the silicic acid hydrosol on the alkaline side of neutrality. This may be readily accomplished by adding a dilute acid to a dilute solution of sodium silicate.

To illustrate one manner of carrying out the invention, 5 ccs. of a solution of sodium silicate, specific gravity 1.2, are added to 100 ccs. of ammonia preserved latex containing 36% of total solids. To this are now rapidly stirred in 10 ccs. of 6% boric acid. The mixture will set to a firm reversible gel in a few minutes, and the gel may be used with very satisfactory results in spreading, coating, and in other manufacturing operations. Instead of the above proportions, 20 ccs. of sodium silicate solution may be employed and 19 ccs. of acetic acid may be stirred in afterwards. Again gel formation will take place in a few minutes.

To illustrate the invention as applied to more concentrated latices, the following may be given. To 100 ccs. of 50% latex are added 5 ccs. of a 25% solution of sodium silicate. Thereafter, 1 to 5 ccs. of a 20% solution of ammonium oleate are thoroughly stirred into the latex. In the course of 15 minutes or thereabouts, a thick reversible latex gel is obtained.

The hydrosol of silicic acid may be preformed and added to the latex. For example, to 60 ccs. of a solution of sodium silicate, specific gravity 1.2, are added 25 ccs. of 7% acetic acid. This forms a clear hydrosol of silicic acid on the alkaline side of neutrality. To this hydrosol are now added 130 ccs. of 36% ammonia preserved latex, thoroughly stirred in and allowed to stand. A reversible gel forms in about 5 minutes.

Similar results may be obtained by the use of the acid hydrosol. To 60 ccs. of 7% acetic acid, 32 ccs. of sodium silicate solution, sp. gr. 1.2, are added and stirred in thoroughly. The clear liquid hydrosol thus obtained is then added to 100 ccs. of uncoagulated acid latex. Gelling occurs in about 5 minutes.

Uncoagulated gels similar to the above may be formed with practically any kind of latex having any concentration of solids. The invention applies alike to natural latices, artificial latices, vulcanized latices, or creamed latices, irrespective of their concentration and irrespective of whether or not they contain compounding ingredients, vulcanizing materials, etc. The phenomenon of gelling may be imposed upon any latex composition regardless of its consistency or fluidity. The invention may likewise be applied to latex compositions in which a partial coagulation or aggregation of the rubber portion has occurred or has been deliberately brought about.

The hydrosols may be formed from solution of any suitable silicate, such as sodium silicate or potassium silicate, or from the ordinary water glass of the trade. The concentration of the silicate solution may be varied, and the percentage of acid required to form the hydrosol suitably adjusted with reference to the actual silica content of the solution. Any acid may be used to form the hydrosol—for example, acetic, boric, citric, benzoic, hydrochloric, sulphuric, and in fact any acid having, at the dilution employed, a value between pH4 and pH6, or at which coagulation does not occur. The materials which may be thus employed also include such materials as salts of the higher fatty acids, as for example, ammonium oleate or ammonium stearate or the equivalent of these.

A wide range of percentages of hydrosol may be incorporated with the latex. From 1.5 to 40 ccs. of a 25% solution of sodium silicate may be added per 100 ccs. of latex. The amount of fatty acid salt may be varied between 0.1% to 11.5% on 100 parts of latex, and the acid salt may be added in concentration as high as 50%. The amount of material added to the latex will naturally depend upon the desired viscosity or consistency of the product and the selection of the most suitable amounts will likewise be governed by the uses to which the composition is to be put. It will frequently be found that the gels formed on the alkaline side of neutrality are preferably for spreading and coating operations, while the direct preparation of objects by molding, etc. can frequently be better accomplished by the use of gels formed on the acid side of neutrality. Many of the gels formed in accordance with the present invention have the property of rapidly depositing their rubber upon a filtering body or matrix or upon other forms, with or without the aid of an electric current.

One of the advantages of the present invention is that it becomes possible to control the consistency, as for instance, the spreading consistency of a latex composition by the addition of very small amounts of the silica gel. The manufacturing economy of this is quite apparent. Further, the consistency of an extremely fluid latex or latex composition can be increased to a point where the composition does not flow away from a form or drain out of a fabric or mold, but remains in the place where it was deposited. As previously stated, the gelling phenomenon is independent of the presence of compounding ingredients, and can be imposed on a composition already containing compounding ingredients. It is only necessary that the ingredients be in a proper state of suspension in the hydrosol previous to the gelation. Reference to the examples shows that this gelation period may be made comparatively brief, so that it is no hardship to maintain the compounding ingredients in suspension for the necessary few minutes.

The product which is called a reversible rubber gel, has a true gel structure, as may be seen by examination under a microscope or as may be observed from the fact that the gel, when removed from its container, assumes a rigid form, and emits a tone when struck. The rubber particles in the gel are not altered as to their state of aggregation. If the particles were completely uncoagulated just prior to gel formation, they are completely uncoagulated after gel formation. If they were aggregated before gel formation, they will show approximately the same degree of aggregation in the gel. From this it becomes apparent that another great advantage of the invention lies in the fact that the composition may be stabilized for long period of time by the simple formation of a gel. Since this gel is reversible, that is, can be dispersed in water, a composition may be gelled and stored for an extended period, and then redispersed for manufacturing purposes. This particularly important feature of the present invention does not necessitate the introduction of a large amount of extraneous matter into the latex composition, for the result desired can be obtained with extremely small quantities of hydrosol. As little as 1% of gelling agent may be present on 100 parts of rubber. But with increasing amounts, obviously the rigidity of the gell will also be increased. The invention may be used advantageously as a means of preparing latices for shipment. The latex may be concentrated by any suitable method at some convenient point near a source of supply, say for example at the plantation, and the concentrated latex may be then treated with a small percentage of the silicic acid hydrosol, the mixture allowed to gel, and the gel packed in ordinary wooden containers. Since the concentrated latex assumes in a short time a fairly rigid character, not so much care is required in the selection of a transport container. Of course it is understood that the material should not be stored in a location where there is sufficient heat to drive out the moisture remaining in the latex.

The gelled compositions herein described may be utilized generally in any of the manufacturing practices to which latices compounded or uncompounded, vulcanized or unvulcanized, artificial or natural, may be adapted, and such use of the products of this invention, as well as the use of the hydrosol in conjunction with the shipment of normal concentrated or creamed latices, is comprehended by the claims.

Having thus described my invention, what I claim and desired to protect by Letters Patent is:

1. The method of treating latex which comprises incorporating a hydrosol of silicic acid with latex and allowing the latex to stand until gel formation occurs.

2. The method of treating latex which comprises incorporating a small amount of a hydrosol of silicic acid with the latex and allowing the treated latex to stand until a gel uncoagulated latex is formed.

3. The method of treating latex which comprises adding a solution of a silicate to latex, treating the latex with sufficient reagent to form a hydrosol of silicic acid in the latex, allowing the mixture to stand until the whole assumes a true gel structure.

4. The method of treating latex which comprises adding a small amount of silicate solution to latex, introducing sufficient dilute acid to convert the silicate into a hydrosol of silicic acid, allowing to stand until gel formation has occurred, and recovering a gelled uncoagulated latex.

5. The method of treating latex which comprises adding to latex a small amount of sodium silicate in solution and sufficient dilute boric acid to convert the silicate into a hydrosol of silicic acid, allowing to stand until gel formation occurs, and recovering an uncoagulated latex gel.

6. As a new product, latex containing a silicic acid hydrosol, said latex being in the form of a reversible gel, and having properties characteristic of a gel.

Signed at New York, New York, this 8th day of September, 1927.

JOHN McGAVACK.